United States Patent
Sinaguinan (10) Patent No.: US 9,442,647 B2
(45) Date of Patent: *Sep. 13, 2016

(54) SYSTEM AND METHOD FOR LIMITING INTERACTION BETWEEN A PORTABLE ELECTRONIC DEVICE AND A NAVIGATION SYSTEM IN A VEHICLE

(71) Applicant: Honda Motor Co., Ltd., Tokyo (JP)

(72) Inventor: Justin E. Sinaguinan, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 14/507,890

(22) Filed: Oct. 7, 2014

(65) Prior Publication Data

US 2015/0309717 A1    Oct. 29, 2015

Related U.S. Application Data

(63) Continuation-in-part of application No. 14/261,468, filed on Apr. 25, 2014, now Pat. No. 9,297,665.

(51) Int. Cl.
| | |
|---|---|
| *G01C 21/26* | (2006.01) |
| *G06F 3/0484* | (2013.01) |
| *G01C 21/36* | (2006.01) |
| *G06F 1/16* | (2006.01) |

(52) U.S. Cl.
CPC ....... *G06F 3/04847* (2013.01); *G01C 21/3688* (2013.01); *G06F 1/1643* (2013.01); *G06F 1/1698* (2013.01); *G06F 3/0484* (2013.01)

(58) Field of Classification Search
CPC ............ G01C 21/362; G01C 21/3611; G01C 21/3688; H04M 3/42323; G06F 3/04847; G06F 1/1643; G06F 1/1698; G06F 3/0484

USPC ......................................................... 701/430
See application file for complete search history.

(56) References Cited

U.S. PATENT DOCUMENTS

| | | | |
|---|---|---|---|
| 5,654,908 | A | 8/1997 | Yokoyama |
| 6,029,110 | A | 2/2000 | Zuber et al. |
| 7,239,961 | B2 | 7/2007 | Banet et al. |
| 8,055,440 | B2 | 11/2011 | Shintani et al. |
| 8,204,686 | B2 | 6/2012 | Jung et al. |
| 8,285,453 | B2 | 10/2012 | Schroeder et al. |
| 8,559,932 | B2 | 10/2013 | Elliott et al. |
| 2009/0082951 | A1 | 3/2009 | Graessley |
| 2012/0053787 | A1 | 3/2012 | Shintani et al. |

OTHER PUBLICATIONS

Office Action of U.S. Appl. No. 14/261,468 dated Nov. 30, 2015, 9 pages.
Website: "Send results and directions to your car or navigation device—Google Maps Help" https://supportgoogle.com/maps/answer/75505?hl=en, printed Feb. 26, 2014.

*Primary Examiner* — Richard Camby
(74) *Attorney, Agent, or Firm* — Rankin, Hill & Clark LLP (57) ABSTRACT

A method and system for limiting interaction between a portable electronic device and a navigation system in a vehicle. The method and system includes connecting one or more portable electronic devices to the navigation system. The method and system additionally includes determining the presence of one or more passengers within the vehicle. The method and system also includes setting an enabled state of a device destination pointer application stored on the one or more portable electronic devices based on the determination of the presence of one or more passengers within the vehicle. The method and system further includes controlling access to a device destination pointer user interface based on the enabled state of the device destination pointer application.

20 Claims, 4 Drawing Sheets

SYSTEM AND METHOD FOR LIMITING INTERACTION BETWEEN A PORTABLE ELECTRONIC DEVICE AND A NAVIGATION SYSTEM IN A VEHICLE

The application is a continuation-in-part of, and claims priority to, U.S. application Ser. No. 14/261,468, filed on Apr. 25, 2014, the entire application of which is incorporated herein by reference.

BACKGROUND

Vehicle navigation systems have become highly sophisticated over the years. These systems are able to provide various types of route guidance to drivers utilizing various types of interfaces that allow drivers and/or passengers to provide destination point inputs. However, as these systems are advancing in terms of their utility, user interfaces are becoming more complex with more user interface inputs, menus, various graphical user interface screens and sub-screens. The complexity associated with the navigation system user interfaces tend to be confusing to users and can be especially complex for drivers who are trying to find various screens to input different types of destination points (e.g., addresses, points of interests, favorites, etc.) while driving the vehicle.

Another complexity associated with current navigation systems is that some drivers attempt to input destinations to the navigation system while the vehicle is being driven and is in motion. This issue causes a high amount of driver distraction that can contribute to unsafe driving habits and higher risk of accidents. For example, a driver can mistype the characters that form a street address destination and may have to subsequently retype the destination. Such mistyping and retyping can increase the probability of visual, manual, and cognitive distraction from driving that can compromise the safety of the occupants of the vehicle or other vehicles on the road. In order to avoid these distractions, in many cases, the driver has to stop the vehicle to input a destination point before proceeding on the guided route.

SUMMARY

According to one aspect, a method for limiting interaction between a portable electronic device and a navigation system in a vehicle is provided. The method can include connecting one or more portable electronic devices to the navigation system. The method can also include determining the presence of one or more passengers within the vehicle. The method can additionally include setting an enabled state of a device destination pointer application stored on the one or more portable electronic devices based on the determination of the presence of one or more passengers within the vehicle. The method can further include controlling access to a user interface of the device destination pointer application based on the enabled state of the device destination pointer application.

According to a further aspect, a system for limiting interaction between a portable electronic device and a navigation system in a vehicle is provided. The system can include a device destination pointer application that is stored on one or more portable electronic devices that connects the one or more portable electronic devices to the navigation system. The system can include a passenger determinant module that is included as a module of the device destination pointer application that determines the presence of one or more passengers within the vehicle. The passenger determinant module sets an enabled state of the device destination pointer application stored on one or more portable electronic devices and controls access to a device destination pointer user interface based on the determination of the presence of one or more passengers within the vehicle.

According to still another aspect, a computer readable medium including instructions that when executed by a processor execute method for limiting interaction between a portable electronic device and a navigation system in a vehicle is provided. The instructions can include connecting one or more portable electronic devices to the navigation system. The instructions can also include determining the presence of one or more passengers within the vehicle. The instructions can additionally include setting an enabled state of a device destination pointer application stored on the one or more portable electronic devices based on the determination of the presence of one or more passengers within the vehicle. The instructions can further include controlling access to a device destination pointer user interface based on the enabled state of the device destination pointer application.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected," is one in which signals, physical communications, and/or logical communications can be sent and/or received. An operable connection can include a physical interface, a data interface, and/or an electrical interface.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, personal watercraft, and aircraft. In some cases, a motor vehicle includes one or more engines.

An "input device" as used herein can include devices for controlling different vehicle features, which include various vehicle components, systems, and subsystems. The term "input device" includes, but it not limited to push buttons, rotary knobs, and the like. The term "input device" additionally includes graphical input controls that take place within a user interface which can be displayed by various types of mechanisms such as software and hardware based controls, interfaces, or plug and play devices.

An "output device" as used herein can include devices that can derive from vehicle components, systems, subsystems, and electronic devices. The term "output devices" includes, but is not limited to display devices, and other devices for outputting information and functions.

Figure 1:
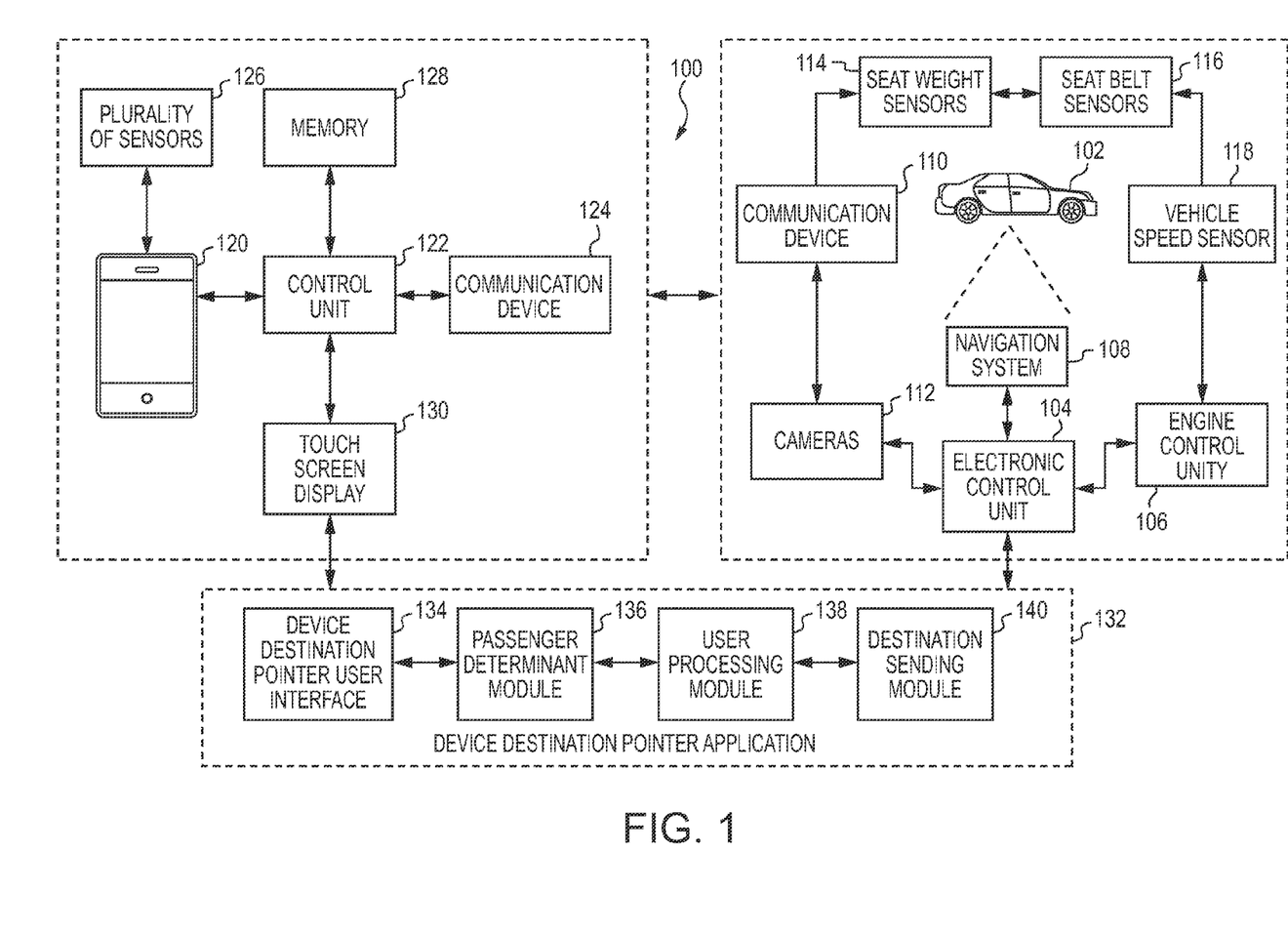
FIG. 1 is a schematic view of an exemplary system for inputting destinations from a portable electronic device to a vehicle navigation system according to an aspect of the present application.

Referring now to the drawings, wherein the showings are for purposes of illustrating one or more exemplary embodiments and not for purposes of limiting the same. FIG. 1 is a schematic view of an exemplary system for inputting destinations from a portable electronic device to a vehicle navigation system according to an aspect of the present application. The system, which can also be referred to as a device destination pointer system, is generally designated by reference numeral 100. The components of the device destination pointer system 100, as well as the components of other systems, hardware architectures and software architectures discussed herein, can be combined, omitted, or organized into different architecture for various embodiments. However, the exemplary embodiments discussed herein focus on the environment 100 as illustrated in FIG. 1, with corresponding system components, and related methods.

As shown in the illustrated embodiment of FIG. 1, the vehicle 102 generally includes an electronic control unit 104 that operably controls a plurality of vehicle systems. The vehicle systems include, but are not limited to, the vehicle navigation system 108 among others including vehicle HVAC systems, vehicle audio systems, vehicle video systems, vehicle infotainment systems, vehicle telephone systems, and the like. The vehicle navigation system 108 is connected to a position determination device (e.g., a vehicle GPS sensor) (not shown) that can also be connected to the electronic control unit 104 to localize (i.e., determine the GPS coordinates) the vehicle 102. In an alternate embodiment, the vehicle navigation system 108 can include its own processor and memory that communicate with the position determination device to determine and provide route guidance to the driver of the vehicle 102.

The electronic control unit 104 includes internal processing memory, an interface circuit, and bus lines for transferring data, sending commands, and communicating with the vehicle systems. Generally, the electronic control unit 104 includes a processor and memory (not shown). The vehicle 102 also includes a communication device 110 for sending data internally in the vehicle 102 to systems including the vehicle navigation system 108 and externally to connected devices. The communication device 110 included within the vehicle 102 is also connected to the electronic control unit 104 and is capable of providing wired or wireless computer communications utilizing various protocols to be utilized to send/receive electronic signals internally to features and systems within the vehicle 102 and to external devices. Generally, these protocols include a wireless system (e.g., IEEE 802.11, IEEE 802.15.1 (Bluetooth®)), a near field communication system (NFC) (e.g., ISO 13157), a local area network (LAN), and/or a point-to-point system. Additionally, the communication device 110 is operably connected for internal computer communication via a bus (e.g., a Controller Area Network (CAN) or a Local Interconnect Network (LIN) protocol bus) to facilitate data input and output between the electronic control unit 104 and vehicle features and systems.

In an exemplary embodiment, the electronic control unit 104 is operably connected to a motion sensing system. In one embodiment, the motion sensing system can include but is not limited to an engine control unit 106, a transmission control unit (not shown), a vehicle speed sensor 118 (that can include wheel speed sensors), and a brake signal sensor (not shown) that provide data to the electronic control unit 104 regarding the state of motion of the vehicle. In one embodiment, the motion sensing system provides data that it monitors and/or obtains as 'state of motion' data of the vehicle 102 to the electronic control unit 104. The electronic control unit 104 analyzes the state of motion data and determines if the vehicle 102 is in motion or is stopped. The electronic control unit 104 operably enables and disables the user interface of the navigation system 108 based on this determination.

The engine control unit 106 can control and provide data regarding the vehicle speed, idle speed, and engine throttle positions. The engine control unit 106 can also determine the status of vehicle components that are operably connected to the engine of the vehicle 102. For example, the engine control unit 106 can determine the quantity of fuel that is injected into the engine from the fuel injection system when the driver is pushing an accelerator. In an exemplary embodiment, a transmission control unit (not shown) is also included within the vehicle 102 as a separate component that is operably connected to the engine control unit 106 to provide data regarding the vehicle transmission (i.e., power train) system. The engine control unit 106 and/or the transmission control unit can provide data to the electronic control unit 104 and/or vehicle systems (e.g., the navigation system 108) to determine the state of motion of the vehicle 102. The engine control unit 106 and transmission control unit can include internal processing memory, an interface circuit, and bus lines for transferring data, sending commands, receiving data, and communicating with vehicle components.

In an exemplary embodiment, the vehicle speed sensor 118 provides speed data related to the vehicle 102 as it is in operation. In other words, the vehicle speed sensor 118 provides data to the electronic control unit 104 and/or the vehicle system to determine the state of motion of the vehicle 102. In an alternate embodiment, the brake signal sensor can be included for sensing signals that are sent from the vehicle braking system and/or a brake light switch to determine when the vehicle brakes are engaged and disengaged by the driver. The brake signal sensor can also include brake pad sensors that provide actuation data each time the brake pads of the vehicle 102 are utilized to provide vehicle braking. The brake signal sensor can also provide information as to when the vehicle 102 is in a fully stopped state.

In one embodiment, when the electronic control unit 104 determines that the vehicle 102 is in motion based on data provided by the motion sensing system, the user interface of the navigation system 108 is disabled (i.e., rendered inoperative) to ensure that the driver cannot operate the navigation system 108 as the vehicle 102 is being driven. When the vehicle 102 is stopped (i.e., is in a fully stopped state), the electronic control unit 104 unlocks (i.e., renders operative) the user interface of the navigation system 108 thereby allowing the driver and/or one or more passengers to operate the navigation system 108 through the navigation system user interface. For example, when the driver has stopped the vehicle 102, the navigation system user interface being displayed on a display screen (not shown) in the vehicle 102 can be accessed by the driver and/or one or more of the passengers to input destinations. Upon the driver accelerating the vehicle 102, the navigation system user interface being displayed can no longer be accessed by the driver and/or one or more of the passengers of the vehicle 102.

In one embodiment, when the navigation system 108 is in a disabled state, and no directions are being provided, a live map showing the location in which the vehicle 102 is traveling is shown on the display screen of the navigation system 108. In another embodiment, when the navigation system 108 provides guidance to a destination that was inputted when the vehicle 102 was in a fully stopped state (i.e., when the navigation system 108 was in an enabled state), the navigation system 108 continues to provide a map with turn by turn directions when the navigation system 108 is in a disabled state. However, neither a driver nor the passenger(s) can provide any further inputs directly onto the user interface of the navigation system 108.

In an exemplary embodiment, the electronic control unit 104 is operably connected to a passenger sensing system. In one embodiment, the passenger sensing system can include but is not limited to one or more cameras (cameras) 112, seat weight sensors 114, and seat belt sensors 116. In one embodiment, the passenger sensing system can provide data to the electronic control unit 104 to be utilized to set an enabled state of the device destination pointer application 132 based on if one or more passengers are detected within the vehicle 102 in order to limit the driver's ability to utilize the device destination pointer application 132 when the vehicle 102 is being driven. Specifically, a device destination pointer user interface 134 of the device destination pointer application 132 can be activated to be accessed by a user when the device destination pointer application 132 is enabled based on data provided by the passenger sensing system. Conversely, the device destination pointer user interface 134 can be deactivated when the device destination pointer application 132 is disabled based on data provided by the passenger sensing system. Accordingly, the driver is restricted from using the device destination pointer application 132 while driving the vehicle 102 without any adult passengers present in the vehicle 102, thereby reducing driver distraction. In one embodiment, the passenger sensing system can also provide data to the electronic control unit 104 regarding the type of passenger(s) (e.g., human adults, human children, and/or animal pets) that is present within the vehicle 102 in order to enable or disable the device destination pointer application 132.

In an exemplary embodiment, the cameras 112 can be located at a plurality of interior and exterior locations of the vehicle 102. In one embodiment, the cameras 112 can be located in areas of the vehicle 102 that allow the cameras 112 to capture images of each of the driver and the passengers of the vehicle 102. For example, the cameras 112 can be disposed above/ahead of each of the driver and passenger vehicle seats in order to capture images in real time of the driver and/or one or more passengers during operation of the vehicle 102. In one embodiment, the cameras 112 can include a microprocessor (not shown) that can execute a camera logic that is stored within processing memory. The camera logic can be executed by the microprocessor based on one or more predetermined plurality of rules. In one embodiment, the camera logic can be executed to provide a determination if one or more passenger seats are utilized by one or more passengers of the vehicle 102 while the vehicle 102 is in operation (in motion). In an alternate embodiment, the camera logic can be executed to provide a determination whether a driver or one of the passenger's is utilizing the portable electronic device 120 while the vehicle 102 is in operation. As described in more detail below, in one embodiment, the microprocessor of the cameras 112 can provide data to the electronic control unit 104 to be utilized to enable or disable the device destination pointer application 132 based on if one or more passengers are detected within the vehicle 102 in order to limit the driver's ability to utilize the device destination pointer application 132 when the vehicle 102 is being driven. In an alternate embodiment, the microprocessor of the cameras 112 can also provide data that is utilized by the electronic control unit 104 to enable or disable certain vehicle features. For example, data from the cameras 112 can be utilized to provide enabling/disabling instructions to a driver sleep avoidance system and other vehicle safety systems (not shown).

In an exemplary embodiment, the seat weight sensors 114 can include a plurality of pressure sensors that are disposed at various areas of the driver and passenger vehicle seats in order to detect occupancy of respective vehicle seats by a driver and/or one or more passengers. In one embodiment, the seat weight sensors 114 can also include a microprocessor (not shown) that is utilized to provide data to the electronic control unit 104 based on sensing of pressure and weight on the vehicle seats. The seat weight sensors 114 can be arranged at different areas of the vehicle seats that are expected to be utilized by a driver and/or one or more passengers, such as the directly beneath seat cushions in order to sense pressure and weight. The seat weight sensors 114 can be utilized on bucket seat and/or bench seat configurations. In one embodiment, the seat weight sensors 114 can measure the distribution of weight and the center of gravity that is exerted on the vehicle seats in order to determine if one or more of the vehicle seats is being utilized by an occupant or if an object is placed on one or more of the vehicle seats.

In an alternate embodiment, the seat weight sensors 114 can measure the distribution of weight and the center of gravity that is exerted on the vehicle seats to determine if the passengers are human adults, human children, and/or animal pets. For example, the seat weight sensors 114 can be utilized to determine if an infant car seat is positioned on the vehicle seat and is being utilized by an infant child. In one embodiment, the microprocessor of the seat weight sensors 114 can provide data to the electronic control unit 104 to be utilized to enable or disable the device destination pointer application 132 based on if one or more passengers are detected within the vehicle 102. In an alternate embodiment, the microprocessor of the seat weight sensors 114 can also provide data that is utilized by the electronic control unit 104 to enable or disable certain vehicle features. For example, the seat weight sensors 114 can be utilized to provide enabling/disabling instructions to a vehicle air bag system (not shown), a vehicle seat belt warning system (not shown), among others.

In an exemplary embodiment, the seat belt sensors 116 can be disposed at various locations of the seat belts of the vehicle seats to determine if a seat belt is being utilized by a driver and/or one or more of the passengers within the vehicle 102. For example, in one embodiment, the seat belt sensors 116 can be located at a buckle location of the seat belts of the vehicle seats to determine if a seat belt is buckled. In an alternate embodiment, the seat belt sensors 116 can be located within a sash portion and/or a lap belt portion of the seat belt of the vehicle seats in order to detect the presence of the driver and/or one or more passengers occupying the vehicle seats. In one embodiment, the seat belt sensors 116 can be utilized in conjunction with the seat weight sensors 114 to determine if the seat belt is being utilized by the driver and/or one or more passengers that are determined to be occupying the vehicle seats. For example, a seat belt alarm can be provided and actuated when the seat weight sensors 114 determine that the driver and/or passengers are occupying the vehicle seats and the seat belt sensors 116 determine that the seat belts are not being utilized on the respective seats.

In an exemplary embodiment, the seat belt sensors 116 can include a microprocessor (not shown) that can provide data to the electronic control unit 104 based on the utilization of the vehicle seat belts. In one embodiment, the microprocessor of the seat belt sensors 116 can provide data to the electronic control unit 104 to be utilized to enable or disable the device destination pointer application 132 based on if one or more passengers are detected within the vehicle 102. In an alternate embodiment, the microprocessor of the seat belt sensors 116 can also provide data that is utilized by the electronic control unit 104 to enable or disable certain vehicle features. For example, data from the seat belt sensors can be utilized to provide enabling/disabling instructions to the vehicle air bag system, and systems that utilize driver biometric data (not shown), among others.

As shown in the exemplary embodiment of FIG. 1, the portable electronic device 120 includes a communication device 124 that communicates directly with the communication device 110 of the vehicle 102. The portable electronic device 120 and components that will be discussed herein can be utilized by one or more passengers to provide inputs to the navigation system 108 as the vehicle 102 is being driven and is in motion. This functionality ensures that the one or more passengers can input destination points to the navigation system 108 while the navigation system 108 is in a disabled state. In other words, the one or more passengers can input destinations and the driver can receive navigation guidance (i.e., turn-by-turn directions) to the destination of choice while the navigation system interface is in a disabled state. This functionality also ensures that the one or more passengers and not the driver can input destination points through the portable electronic device 120 to the navigation system 108 while the vehicle 102 is being driven and is in motion. In one embodiment, one or more passengers determined to be located in any of the vehicle seats can provide destination inputs to the navigation system 108. For example, one or more passengers determined to be located in the rear seat(s) of the vehicle 102 can utilize their portable electronic device(s) 120 to provide destination inputs to the navigation system 108.

Generally, the portable electronic device 120 of the device destination pointer system 100 can be a computing device having a touch screen display 130, which enables user input (e.g., touch keyboard), and a control unit 122 for providing processing and computing functions. The portable electronic device 120 can include, but is not limited to, a handheld device, a mobile device, a smart phone, a laptop, a tablet, and an e-reader. In general, the control unit 122 is operatively connected to a plurality of sensors 126, a memory 128, a communication device 124, a touch screen display 130, and optionally any other input device (e.g., hard buttons, switches, a keyboard, etc.). The touch screen display 130 provides and facilitates user input and output. The touch screen display 130 can include a color LCD display, which includes touch screen sensors for user input that provide touch screen functionality.

The communication device 124 of the portable electronic device 120 can include antennas and components that can be utilized for wired and wireless computer connections and communications via various protocols. The communication device 124 is capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In particular, the communication device 124 can be utilized to provide web based applications and internet resources to the user (e.g., a driver and/or one or more passengers of the vehicle 102). In addition, the communication device 124 provides peer-to-peer (P2P) connections over to send/receive electronic signals with an external device to be utilized by software applications installed within the memory 128 of the portable electronic device 120. Accordingly, in the embodiment shown in FIG. 1, the communication device 124 of the portable electronic device 120 is utilized to provide P2P communications to send and receive electronic signals with the communication device 110 of the vehicle 102. In an exemplary embodiment, the electronic signals are sent to the electronic control unit 104 of the vehicle 102 in order to be utilized by the navigation system 108 to provide destinations supplied by the passenger(s) through the device destination pointer application 132 that resides within the memory 128 of the portable electronic device 120.

In one embodiment, one or more portable electronic devices 120 can connect to the vehicle 102 via a Bluetooth® connection that can be utilized to provide data connections to support telephonic communication, play music, and/or utilize applications residing within the memory 128 of the portable electronic device 120. Specifically, the portable electronic device 120 connects via Bluetooth® to the vehicle 102 and the device destination pointer application 132 connects to the navigation system 108 directly or through the electronic control unit 104 to provide bilateral communications (via the communication devices 110, 124). In another embodiment, an alternate type of wireless (e.g., Wi-Fi) connection or a wired (e.g., USB) connection can be utilized to connect the portable electronic device 120 to the vehicle 102 and can be utilized by the device destination pointer application 132 to communicate with the navigation system 108 (via the communication devices 110, 124).

The plurality of sensors 126 of the portable electronic device 120 can include but are not limited to an accelerometer, a magnetometer, a gyroscope, an ambient light sensor, a proximity sensor, a global positioning sensor system, a back illuminated sensor, among others. The plurality of sensors 126 that will be discussed with reference to the components of FIG. 1 can include the magnetometer, the accelerometer, the gyroscope and the global positioning sensor system (not shown).

In an exemplary embodiment, the device destination pointer application 132 is a software application that is installed directly onto the memory 128 of the portable electronic device 120. In another embodiment, the device destination pointer application 132 and/or one or more of the components of the device destination pointer application 132 can be installed externally from the memory 128 of the portable electronic device 120. For example, the device destination pointer application 132 can include a web based application that is accessed by the communication device 124 of the portable electronic device 120. In other embodiments, the device destination pointer application 132 can include a cloud based application that resides on an external host server but is accessed through a viewer application that is installed on the memory 128 of the portable electronic device 120.

Although the embodiments discussed herein discuss the device destination pointer application 132 as an independent application, the device destination pointer application 132 can be integrated with and/or within other vehicle related software or web based applications that reside on or are accessed via the portable electronic device 120. In alternate embodiments, the device destination pointer application 132 can be used as a plug-in/add-on to software that is utilized during operation a web browser on the portable electronic device 120. As a plug-in/add-on, the device destination pointer application 132 can be automatically enabled when the web browser and/or another application is launched by the user, or enabled upon the detection of a communication link between the communication device 124 and the electronic control unit 104 and/or navigation system 108.

The device destination pointer application 132 includes various modules, discussed in detail below, that are controlled and operated by the control unit 122 of the portable electronic device 120. As a stand alone application, the device destination pointer application 132 includes the device destination pointer user interface 134 that includes user input icons and/or user input tiles that provide passengers with the ability to select from several destination input choices. The destination input choices can include but are not limited to a street address destination input icon/tile, a point of interest destination icon/tile, a prior destination input icon/tile, a favorite destination input icon/tile, and a home destination input icon/tile, a latitude/longitude input icon/tile and the like. The passenger(s) can utilize the various user interface icons/tiles to input a destination of choice.

The device destination pointer application 132 can be launched by user input of an executable icon on the touch screen display 130. In an exemplary embodiment, upon launching of the device destination pointer application 132, the functionality of the device destination pointer application 132 is disabled. The device destination pointer application 132 can present an introductory splash screen shown to the user on the touch screen display 130 as part of the device destination pointer user interface 134 while a determination is made to enable the (functionality of the) device destination pointer application 132, as described in more detail below.

In an exemplary embodiment, upon being enabled, the device destination pointer application 132 allows one or more passengers to input the destination point of choice through the device destination pointer user interface 134 using the portable electronic device 120 to be utilized to provide route guidance through the navigation system 108 while the vehicle 102 is in motion (i.e., while the user interface of the navigation system 108 is disabled).

In one embodiment, the device destination pointer application 132 communicates with the navigation system 108 directly upon being enabled to populate prior destinations, favorite destinations, home destination, and/or point of interest destinations. In an alternate embodiment, the device destination pointer application 132 maintains its own set of prior destinations, favorite destinations, and/or home destination based on (previous) inputs received (during previous sessions) from the passenger(s) on the portable electronic device 120.

In an additional embodiment, the device destination pointer application 132 can further utilize the communication device 124 of the portable electronic device 120 to connect to an external server(s), external database(s), web based websites/systems, and/or portable device applications (e.g., search engines, social media applications, online urban guides, online recommendation services, etc.) to provide points of interest destinations (i.e., specific names of places) that are based on various point of interest categories (e.g., food, lodging, transportation, fuel, shopping, entertainment, emergency services, etc.) and a vicinity to the current location (i.e., GPS coordinates) of the vehicle 102 of specific places that fall under the point of interest categories. In some embodiments, the device destination pointer application 132 can be directly connected to a search engine to allow the user to input a specific name of a place that the user would like to provide as a destination point (e.g., hotel name, restaurant name, museum name, etc.).

In an exemplary embodiment, after the device destination pointer application 132 is launched by the user, the device destination pointer application 132 is selectively enabled based on the presence of one or more passengers within the vehicle 102 in order to ensure that the driver cannot bypass the disabled user interface of the navigation system 108 by utilizing the device destination pointer application 132 on the portable electronic device 120. In other words, the device destination pointer application 132 can be enabled and disabled based on the determination that one or more passengers are located within the vehicle 102 while the driver is driving the vehicle 102. In an exemplary embodiment, upon the user launching the device destination pointer application 132, if it is determined that one or more passengers are not located within the vehicle 102, the device destination pointer application 132 and all related functionality are disabled in order to limit the driver's ability to provide inputs to the device destination pointer user interface 134. In one embodiment, the device destination pointer user interface 134 can provide a disable interface splash screen. The disable interface splash screen can detail that the device destination pointer application 132 has been disabled since passengers were not detected within the vehicle 102. For example, the destination pointer user interface 134 can show a message on the disable interface splash screen that states, "Passenger is not Detected, the Device Destination Pointer Application has been disabled."

In the exemplary embodiment of FIG. 1, the device destination pointer application 132 includes a passenger determinant module 136. The passenger determinant module 136 determines the presence of one or more passengers within the vehicle 102 and reactively enables or disables the device destination pointer application 132 (while the user interface of the navigation system 108 remains in a disabled state when the vehicle 102 is in motion). In one embodiment, the passenger determinant module 136 provides an enabled state as enabled or disabled to the control unit 122 of the portable electronic device 120 based on the determination that one or more passengers are present or not present within the vehicle 102. In an exemplary embodiment, the passenger determinant module 136 communicates with the electronic control unit 104 to obtain data from the one or more of the cameras 110, the seat weight sensors 114, and/or the seat belt sensors 116 in order to determine the presence of one or more passengers within the vehicle 102.

In one embodiment, upon the user launching the device destination pointer application 132, the passenger determinant module 136 can utilize the communication device 124 to communicate a passenger determination request to the electronic control unit 104 to determine the presence of one or more passengers within the vehicle 102 based on the receipt of data by electronic control unit 104 from the cameras 112, seat weight sensors 114, and/or seat belt sensors 116. In an alternate embodiment, the passenger determinant module 136 periodically communicates the passenger determination request to the electronic control unit 104 to determine the presence of one or more passengers within the vehicle 102 independent of the user launching the device destination pointer application 132.

In one embodiment, upon receiving the passenger determination request, the electronic control unit 104 can evaluate the data provided by the cameras 112 to determine if the one or more real time images provided by the cameras 112 of the passenger vehicle seats shows the passenger vehicle seats as occupied by the one or more passengers in order for the passenger determinant module 136 to enable/disable the device destination pointer application 132. In an alternate embodiment, the electronic control unit 104 can evaluate the data provided by the cameras 112 to determine if the driver is utilizing the portable electronic device 120 in order for the passenger determinant module 136 to enable/disable the device destination pointer application 132 upon it being launched. For example, if the one or more real time images provided by the cameras 112 include the driver using the portable electronic device 120 at the time that the device destination pointer application 132 is launched, the passenger determinant module 136 can disable the device destination pointer application 132 to prevent the driver from using it.

In one embodiment, upon receiving the passenger determination request, the electronic control unit 104 can evaluate the data provided by the seat weight sensors 114 to determine the presence of one or more passengers occupying the passenger vehicle seats in order for the passenger determinant module 136 to enable/disable the device destination pointer application 132. In an alternate embodiment, the seat weight sensors 114 can also provide data that can be utilized to determine the type of passenger that is occupying the vehicle passenger seats in order for the passenger determinant module 136 to enable/disable the device destination pointer application 132. For example, the seat weight sensors can provide data pertaining to the distribution of weight and the center of gravity that is exerted on the vehicle seats in order for the passenger determent module 136 to disable the device destination pointer application 132 if it is determined that there are no human adult passengers located within the vehicle 102 (e.g., the seat weight sensors 114 determine that the one or more passengers occupying the vehicle passenger seats are children and/or pets).

In one embodiment, upon receiving the passenger determination request, the electronic control unit 104 can evaluate the data provided by the seat belt sensors 116 to determine the presence of one or more passengers utilizing the seat belts of the passenger vehicle seats in order for the passenger determinant module 136 to enable/disable the device destination pointer application 132. For example, upon determining that one or more of the passenger vehicle seat belts are being utilized by the one or more passengers, the electronic control unit 104 can provide this data to the passenger determinate module 136 to enable the device destination pointer application 132.

In an exemplary embodiment, the cameras 112 can be utilized in conjunction with the seat weight sensors 114 and the seat belt sensors 116 to provide data to the electronic control unit 104 in order to make the determination that one or more passengers are located within the vehicle 102 when the vehicle is in movement (based off of data provided by the motion sensors, as described above). For example, the seat belt sensors 116 can be utilized to determine that one or more passengers are occupying the vehicle passenger seat belts, while the seat weight sensors 114 can be utilized to confirm that the one or more passengers are human adult passengers. Additionally, the cameras 112 can be utilized (in conjunction with the seat weight sensors 114 and the seat belt sensors 116) to determine that one of the determined (human adult) passengers are using the portable electronic device 120 (based on real time image data) when the device destination pointer application 132 is executed (and that the driver is not using the portable electronic device 120 while driving the vehicle 102).

In an exemplary embodiment, the electronic control unit 104 provides the determination on the presence of one or more passengers within the vehicle 102 to the passenger determinant module 136 based on the passenger determination request. In one embodiment, if the passenger determinant module 136 determines the presence of one or more passengers within the vehicle 102, the passenger determinant module 136 enables the device destination pointer application 132. Conversely, if the passenger determinant module 136 determines that one or more passengers are not present within the vehicle 102, the passenger determinant module 136 disables the device destination pointer application 132 in order to ensure that the driver cannot use his or her portable electronic device 120 to utilize the functionality of the device destination pointer application 132.

In one embodiment, the passenger determinant module 136 can enable the device destination pointer application 132 upon also determining that the one of the one or more passengers is an human adult passenger in order to ensure that the driver can not use the functionality of the device destination pointer application 132 to provide inputs to the navigation system 108 even though the presence of one or more passengers is determined within the vehicle 102. For example, a driver driving the vehicle 102 with small children present within the vehicle 102 as the only passengers will not be able to utilize the device destination pointer application 132, despite the fact that there are one or more passengers present within the vehicle 102.

In one embodiment, upon the passenger determinant module 136 determining the presence of one or more passengers within the vehicle 102, the device destination pointer application 132 can utilize the plurality of sensors 126 to determine a user classification category of the user that is utilizing the portable electronic device 120 to use the device destination pointer application 132. In other words, once it is determined that one or more passengers are present within the vehicle the device destination pointer application 132 ensures that one of the passenger's and not the driver is utilizing the device destination pointer application 132. In one embodiment, as discussed above, the passenger determinate module 136 can communicate with the electronic control unit 104 to evaluate data provided by the cameras 112 (based on determinations using camera logic) that includes real time images of the one or more passenger's utilizing the portable electronic device 120 at the same point of time that the device destination pointer application 132 is launched. For example, if the real time image data provided by the cameras 100 show that only the driver is utilizing the portable electronic device 120 and the passengers are not utilizing one or more of the portable electronic device(s) 120, the passenger determinant module can disable the device destination pointer application 132.

In some embodiments, the device destination pointer application 132 includes a user ID (i.e., user identification user name and password) that corresponds to the user that is utilizing the device destination pointer application 132. The destination pointer application 132 is enabled once it is determined that the user is one of the passengers of the vehicle 102 based on the user classification category and/or the user identification number.

In an exemplary embodiment, the device destination pointer application 132 includes a user processing module 138 that utilized once the passenger determinant module 136 enables the device destination pointer application 132. In an exemplary embodiment, the user processing module 138 determines if a driver or one or more passengers is operating one or more portable electronic devices 120 in order to utilize the device destination pointer application 132. In one embodiment, the user processing module 138 can disable the device destination pointer application 132 in the same manner as the passenger determinant module 136 upon determining that the driver is operating the one or more portable electronic devices 120 in order to utilize the device destination pointer application 132.

The user processing module can utilize the plurality of sensors 132 along with sensors located within the vehicle 102 to determine the directional orientation and positional location of the portable electronic device 120 with respect to the vehicle 102. This determination provides details as to the location of the user (utilizing the portable electronic device 120) within the vehicle 102 to ensure that one of the passengers and not the driver is utilizing the device destination pointer application 132.

The user processing module 138 can utilize the control unit 122 to access the magnetometer included within the plurality of sensors 126. The magnetometer can be utilized to determine the cardinal and ordinal directional orientation and positional location of the portable electronic device 120 with respect to the vehicle 102, as described in more detail below. In one embodiment, the vehicle 102 can include an onboard digital compass (not shown) that is operably connected to the electronic control unit 104. The user processing module 138 can access the communication device 124 to initiate communication with the electronic control unit 104 to determine the directional orientation and locational position of the vehicle 102 based on data provided by the onboard digital compass.

Figure 2:
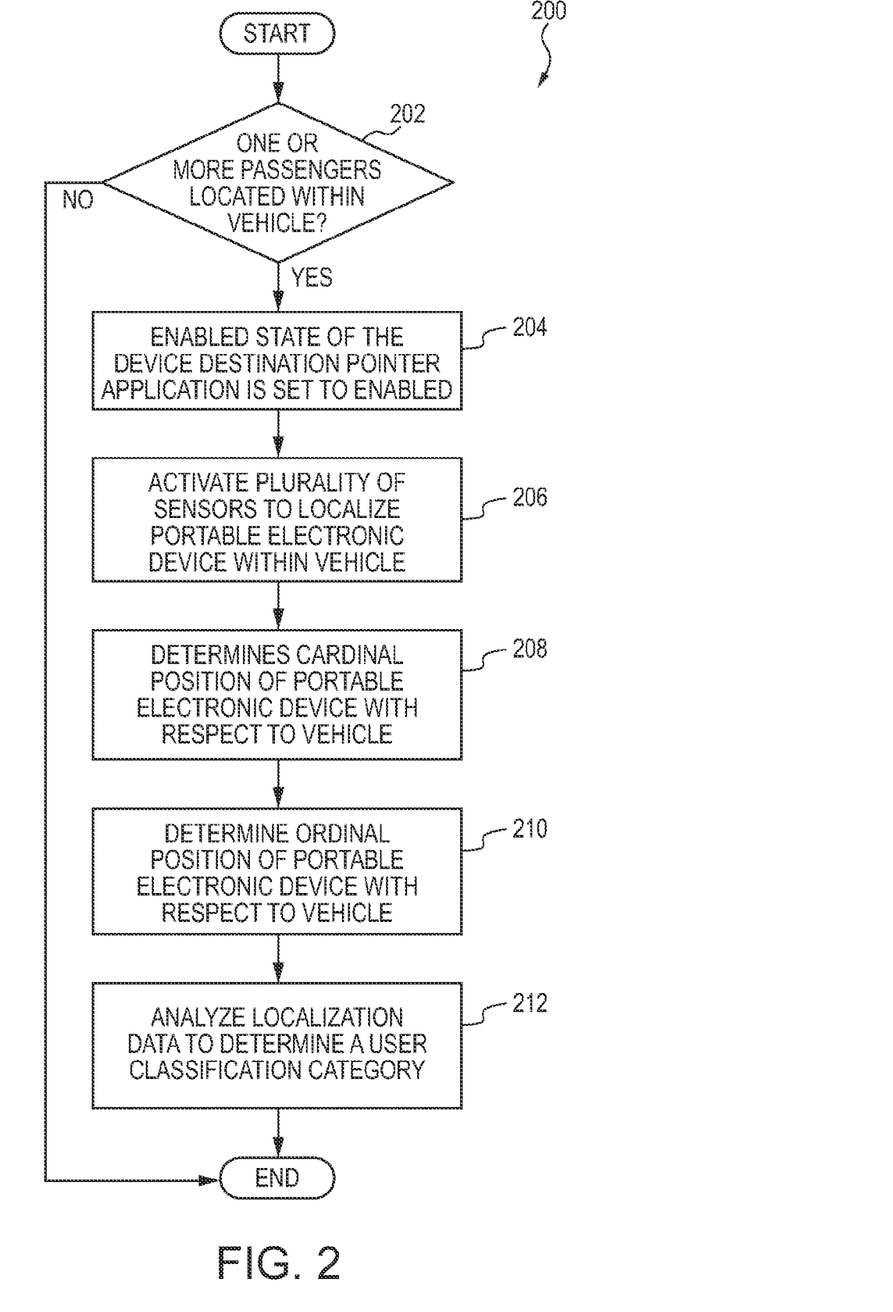
FIG. 2 illustrates an exemplary method utilized by an embodiment of a device destination pointer application for determining a type of user that is operating a portable electronic device from the operating environment of FIG. 1 according to an aspect of the present application.

Referring now to FIG. 2, an exemplary method 200 utilized by an exemplary embodiment of the device destination pointer application 132 for determining a type of user that is operating the portable electronic device 120 from the operating environment of FIG. 1 according to an aspect of the present application is illustrated. The method 200 starts with making a determination of the presence of one or more passengers within the vehicle 102. Specifically, at step 202, the passenger determinate module 136 determines if one or more passengers are located within the vehicle. As described above, in an exemplary embodiment, the passenger determinate module 136 can utilize the communication device 124 to communicate utilizing various protocols, as described above, to access the communication device of the vehicle 102 to enable communication for exchanging information with the electronic control unit 104 (in order to send/receive a passenger determination request/response to the electronic control unit 104 of the vehicle 102). The electronic control unit 104 determines the presence of one or more passengers in the vehicle 102 based on data that is received from the passenger sensing system. The electronic control unit 104 sends a response (via computer communication) to the passenger determination request that is received by passenger determinant module 136 based on the detected presence of one or more passengers within the vehicle 102.

The passenger determinant module 136 sets an enabled state of the device destination pointer application 132 based on the data provided by the electronic control unit 104, as will be discussed in more detail below. If it is determined that one or more passengers are not located within the vehicle 102 (at block 202), the method 200 ends as the enabled state of the device destination pointer application 132 is set to disabled in order to limit the driver's ability to provide inputs to the device destination pointer user interface 134. As described above, the device destination pointer user interface 134 can provide a disable interface that details that the device destination pointer application 132 has been disabled, as passengers were not detected within the vehicle 102.

At block 204, if it is determined that one or more passengers is located within the vehicle (at block 202), the enabled state of the device destination pointer application 132 is set to enabled. In one embodiment, the passenger determinate module 136 can send an enablement command to the control unit 122 that sets the enabled state to enabled and thereby enables the device destination pointer application 132 to be utilized. At block 206, the user processing module 138 activates the plurality of sensors 126 to localize the position of the portable electronic device 120 within the vehicle 102. At block 208, the user processing module 138 determines the cardinal position of the portable electronic device 120 with respect to the vehicle 102. This determination provides the cardinal location of the user with respect to the vehicle 102. For example, if the portable electronic device 120 is located a few degrees south of the north-facing vehicle 102, then the user processing module 138 can determine that the user can be located within the vehicle 102.

At block 210, the user processing module 138 determines the ordinal position of the user with respect to the vehicle 102. The user processing module 138 assigns a guidance point at a front center portion of the vehicle 102. The portion of the vehicle 102 where the guidance point is located can vary depending on the cardinal position of the portable electronic device 120 (found in block 208). In the example provided above, if portable electronic device 120 is determined to be located south of the guidance point located at the front center portion of the north-facing vehicle 102, the user processing module 138 further analyzes if the location of the portable electronic device 120 is southeast, southwest, or directly south of the guidance point to determine the right, left, or center position of the user within the vehicle 102. Furthermore, the user processing module 138 determines how many degrees southeast, southwest, or south the portable electronic device 120 is located from the guidance point to determine if the user is located within the right, left, or center front or rear vehicle seats when the user is utilizing the device destination pointer application 132.

Other components and methods can be utilized to determine the orientation of the vehicle 102 and the location of the portable electronic device 120 within the vehicle 102. For example, in another embodiment, a GPS sensor system, included within the plurality of sensors 126 of the portable electronic device 120, is utilized in conjunction with the position determination device operably connected to the electronic control unit 104 within the vehicle 102 to triangulate and calculate the global position of the portable electronic device 120 with respect to the vehicle 102. In yet another exemplary embodiment, the GPS sensor system along with the magnetometer included within the plurality of sensors 126 and the digital compass located within the vehicle 102, can be utilized in conjunction to determine the orientation of the vehicle 102 and the portable electronic device 120 in order to triangulate the position of the portable electronic device 120 with respect to the vehicle 102.

With continued reference to FIG. 2, once the determination of the orientation and location of the portable electronic device 120 with respect to the vehicle 102 is complete, at step 212, the user processing module 138 analyzes the localization data to determine a user classification category. The user classification category is allocated to the user that is utilizing the device destination pointer application 132 on the portable electronic device 120. In an exemplary embodiment, the user processing module 138 categorizes the user as a 'driver' or a 'passenger' of the vehicle 102. In other embodiments, additional classifications can be designated for the user based on data that is provided by the electronic control unit 104 (as detected by the cameras 112, seat weight sensors 114, and/or seat belt sensors 116) to the passenger determinant module 136 (e.g., front seat passenger, left hand side rear passenger, right hand side rear passenger, adult, child, non-human occupant, etc.)

In an exemplary embodiment, if the user processing module 138 determines that, based on the positional location of the portable electronic device 120 when utilizing the device destination pointer application 132, the user is located in the front driver side seat, the user processing module 138 designates the user as a 'driver', and the device destination pointer application 132 is disabled in a similar fashion as described above with respect to the passenger determinate module 136. If the user processing module 138 determines the user to be located in a passenger front or rear seat, the user processing module 138 designates the user as a 'passenger' and controls access to the device destination pointer user interface 134 to allow the user to input a desired destination point to be utilized by the navigation system 108.

In one embodiment, the user processing module 138 can utilize data provided by the cameras 112 to validate that the driver is not attempting to circumvent the system by attempting to operate the portable electronic device 120 by extended his/her arm towards one of the passenger seats of the vehicle 102. Specifically, upon determining the user based on the positional location of the portable electronic device 120, the camera logic can be executed to provide a validation determination to validate that one of the passenger's is utilizing the portable electronic device 120 while the vehicle 102 is in operation.

In an additional embodiment, the user processing module 138 can designate the user classification category as a 'driver' or a 'passenger' based off of the user ID of the user that is associated to the user identification credentials (username and password) that are utilized to log into the device destination pointer application 132. In this embodiment, if the user ID is associated to a driver, the destination pointer application 132 is disabled once the electric control unit 104 sends a signal to the control unit 122 (in the manner described above) based on the state of motion of the vehicle 102. Alternatively, if the user ID is associated to a passenger, the destination point application 132 is enabled for the passenger to input a destination point to be utilized by the navigation system 108 to provide route guidance. In some embodiments, the localization data can be utilized as a means to verify that the passenger is utilizing the device destination pointer application 132 once a user logs into the device destination pointer application 132 with a user ID corresponding to the passenger to ensure that in fact the passenger is utilizing the device destination pointer application 132. In other embodiments, real time image data provided by the cameras 112 can be utilized as a means to verify that the passenger is utilizing the portable electronic device 120 once a user logs into the device destination pointer application 132 with a user ID corresponding to the passenger to ensure that in fact the passenger is utilizing the device destination pointer application 132.

In an exemplary embodiment, while the vehicle 102 is in motion, one or more passengers can utilize the device destination pointer user interface 134 and provide inputs to the user input icons and/or user input tiles to input a desired destination point. In one embodiment, the electronic control unit 104 accepts inputs from more than one portable electronic device 120 being used by more than one passenger based on the order of connection between each portable electronic device 120 and the vehicle 102. For example, if two passengers are both attempting to use the device destination pointer application 132 to provide inputs to the navigation system 108, the electronic control unit 104 will accept inputs from the passenger that first connected their portable electronic device 120 to the vehicle 102. In one embodiment, if more than one portable electronic device 120 connects to the vehicle 102 simultaneously, the electronic control unit 104 accepts inputs from the portable electronic device 120 that first provides inputs to the navigation system 108 via the device destination pointer application 132. Various alternative manners for prioritizing more than one portable electronic device 120 utilizing the device destination pointer application 132 to provide inputs to the navigation system 108 will be apparent.

In an exemplary embodiment, if the vehicle 102 is in a fully stopped state, the driver and/or the passenger(s) can utilize the device destination pointer user interface 132 and provide inputs to the user input icons and/or user input tiles to input a desired destination point. Once a desired destination point is inputted, a destination sending module 140 can utilize the communication device 124 of the portable electronic device 120 to send the destination point to the navigation system 108 via the communication device 110 of the vehicle 102. The sending of the destination point by the destination sending module 140 can occur directly from the device destination pointer application 132 to the navigation system 108 or through the electronic control unit 104 to the navigation system 108 to provide route guidance.

In one embodiment, once the user inputs a destination point that is sent by the destination sending module 140 and utilized by the navigation system 108 to provide route guidance, a cancel route user interface input icon appears on the device destination point user interface 134. If the user decides to cancel the route and inputs the cancel route user interface input icon, the device destination pointer application 132 sends a route cancellation request to the navigation system 108 via communication between the communication device 124 and the communication device 110. The navigation system 108 responsively cancels the ongoing route guidance. The user can utilize the device destination pointer application 132 to provide a different destination point input.

Figure 3:
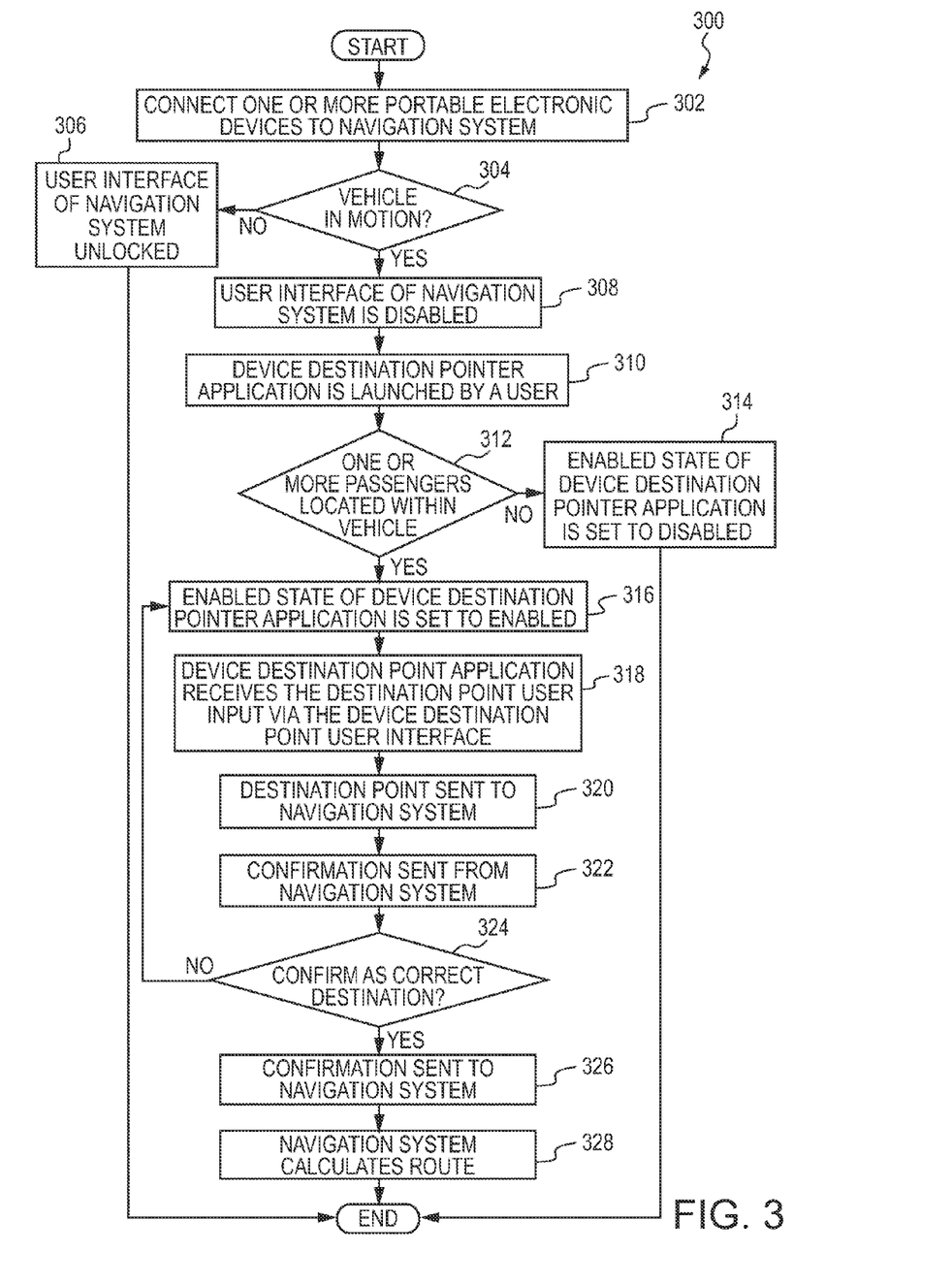
FIG. 3 illustrates an exemplary method for inputting destinations from a portable electronic device to a vehicle navigation system based on the determination of one or more passengers are located within a vehicle according to an aspect of the present application.

Referring now to FIG. 3, an exemplary method 300 for inputting destinations from the portable electronic device 120 to the vehicle navigation system 108 based on the determination of one or more passengers are located within the vehicle 102 according to an aspect of the present application is illustrated. The process begins at block 302 where connecting one or more portable electronic devices 120 to the navigation system 108 occurs. As described in detail above, in one embodiment, the connection can take place between the communication device(s) 124 and the communication device 110 that is connected through the electronic control unit 104. In an alternate embodiment, the connection can take place between the communication device(s) 124 and the communication device 110 that is connected directly to the navigation system 108.

At block 304, it is determined if the vehicle is in motion. Specifically, the electronic control unit 104 determines the state of motion of the vehicle 102 by utilizing data provided by one or more of the engine control unit 106, the transmission control unit, the vehicle speed sensor 118, and/or the brake signal sensor. At block 306, if the electronic control unit 104 determines that the vehicle 102 is not in motion (i.e., the vehicle 102 is in a fully stopped state) (at block 302), the user interface of the navigation system 108 is enabled. Therefore, the driver and/or passenger(s) can directly utilize the user interface of the navigation system 108 to provide destination point inputs. In one embodiment, the driver and/or passenger(s) can alternatively utilize the device destination pointer application 132 via the portable electronic device 120 to provide destination point inputs even when the user interface of the navigation system 108 is in an enabled state.

At block 308, if the electronic control unit 104 determines that the vehicle 102 is in motion, the user interface of the navigation system 108 is disabled. Therefore, neither the driver nor the passenger(s) can directly utilize the user interface of the navigation system 108 to provide destination point inputs. The passenger(s) can alternatively utilize the device destination pointer application 132 to provide destination point inputs once it is determined that one or more passenger(s) and present within the vehicle 102. At block 310, the device destination pointer application 310 is launched by the user. At block 312, a determination is made of the presence of one or more passengers within the vehicle 102. As described above, in an exemplary embodiment, the passenger determinate module 136 communicates with the electronic control unit 104 in order to send/receive a passenger determination request/response to the electronic control unit 104 of the vehicle 102. The electronic control unit 104 determines the presence of one or more passengers within the vehicle 102 based on data that is received from the cameras 112, seat weight sensors 114, and/or the seat belt sensors 116, as described above.

At block 314, if it is determined that one or more passengers are not present within the vehicle 102 (at block 312), the enabled state of the device destination pointer application 132 is set to disabled. At block 316, if it is determined that one or more passengers are located within the vehicle 102 (at block 312), the enabled state of the device destination pointer application 132 is set to enabled. In one embodiment, the device destination pointer user interface 134 is presented to the passenger(s). The device destination pointer user interface 134 can include user input icons and/or user input tiles that provide passengers with the ability to select from several destination point input choices. The passenger(s) can input the destination point (street address, a point of interest, a prior destination, a favorite destination, a latitude/longitude destination, a home destination input, etc.). At block 318, the device destination pointer application 132 receives the destination point user input via the device destination point user interface 134.

At block 320, the destination point is sent to the navigation system 108. In one embodiment, the destination sending module 140 sends the destination point to the vehicle 102 through the electronic control unit 104 or directly to the navigation system 108. At block 322, a confirmation is sent from the navigation system 108. In one embodiment, the navigation system 108 determines the GPS coordinates and location of the destination point and sends a confirmatory message to the destination sending module 140 on the portable electronic device 120 via communication between the communication device 110 of the vehicle 102 and communication device 124 of the portable electronic device 120. In one embodiment, user interface icons are presented to the user on the device destination pointer user interface 134 to confirm or reject the destination. In an alternate embodiment, a timed message appears that asks the passenger to input a 'reject user input' icon within a predetermined number of seconds if the destination point is not correct or the passenger wishes to change the destination point. If the destination point is not correct and/or the passenger wishes to change the destination point, the process returns to block 316 and the user is presented with the device destination pointer user interface 134.

At block 326, if the passenger confirms the destination point as correct by either inputting the confirm user input icon or not inputting the reject user input icon (at block 324), the confirmation is sent to the navigation system 108. In an exemplary embodiment, the confirmation is sent by the destination sending module 132 in a similar manner as the original destination point was sent. At block 328, the navigation system 108 calculates the route and provides route guidance to the driver of the vehicle 102. This method ensures that the navigation system 108 can be safely utilized to provide route guidance to the driver to a desired destination point that is inputted when the vehicle 102 is being driven and is in movement. In addition, if the passenger(s) are present in the vehicle 102, this method allows the driver to avoid stopping the vehicle 102 in order for a destination point to be inputted to the navigation system 108.

Figure 4:
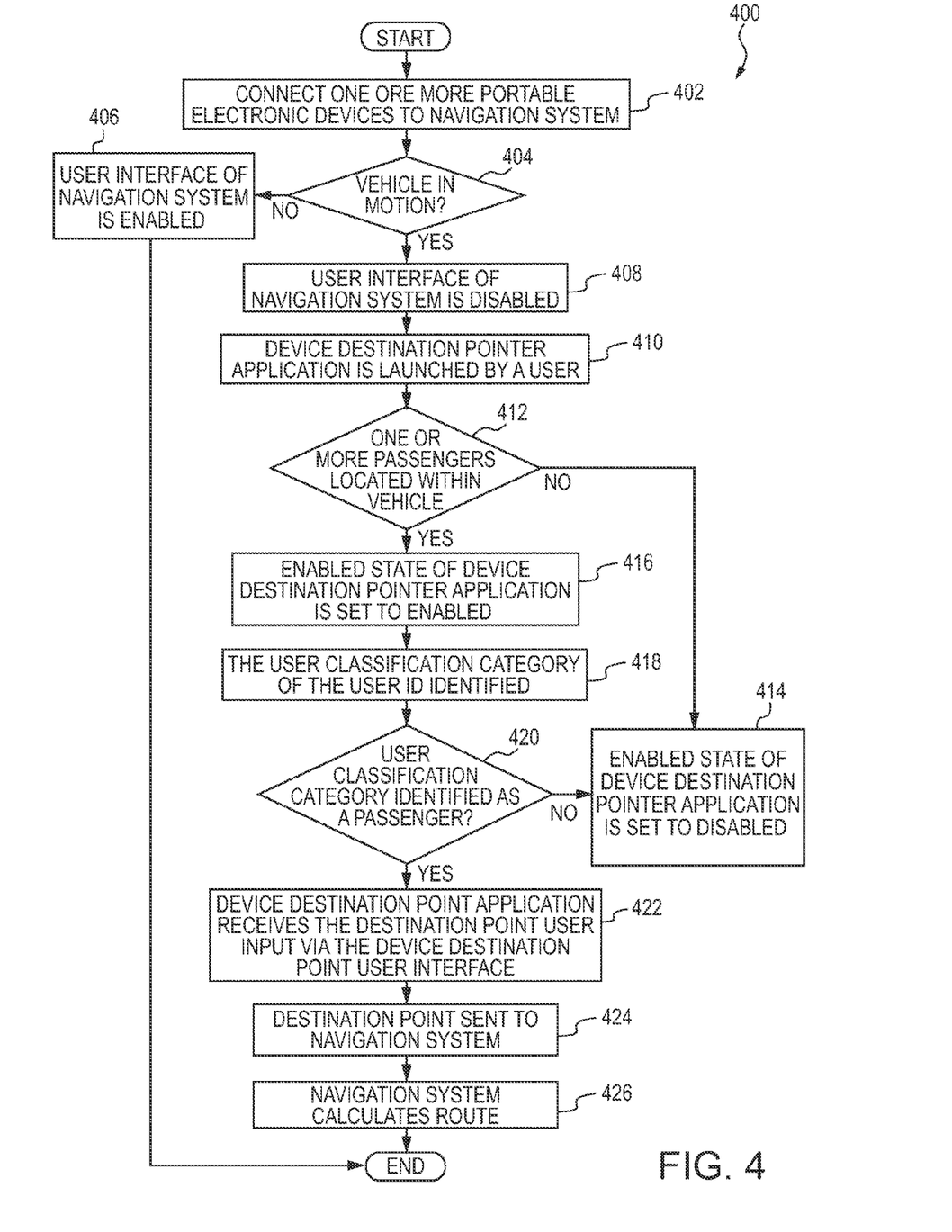
FIG. 4 illustrates an exemplary method for inputting destinations from a portable electronic device to a vehicle navigation system based on the determination of one or more passengers are located within the vehicle and the portable electronic device is being operated by one or more passengers according to an aspect of the present application.

Referring now to FIG. 4, an exemplary method 400 for inputting destinations from a portable electronic device 120 to a vehicle navigation system 108 based on the determination of one or more passengers are located within the vehicle 102 and the portable electronic device 120 is being operated by one or more passengers according to an aspect of the present application is illustrated. The process begins at block 402 where connecting one or more portable electronic devices 120 to the navigation system 108 occurs. At block 404, it is determined if the vehicle is in motion. Specifically, the electronic control unit 104 determines the state of motion of the vehicle 102 by utilizing data provided by one or more of the engine control unit 106, the transmission control unit, the vehicle speed sensor 118, and/or the brake signal sensor. At block 406, if the electronic control unit 104 determines that the vehicle 102 is not in motion (i.e., the vehicle 102 is in a fully stopped state) (at block 402), the user interface of the navigation system 108 is enabled. Therefore, the driver and/or passenger(s) can directly utilize the user interface of the navigation system 108 to provide destination point inputs.

At block 408, if the electronic control unit 104 determines that the vehicle 102 is in motion, the user interface of the navigation system 108 is disabled. Therefore, neither the driver nor the passenger(s) can directly utilize the user interface of the navigation system 108 to provide destination point inputs. At block 410, the device destination pointer application 310 is launched by a user. At block 412, a determination is made of the presence of one or more passengers within the vehicle 102. At block 414, if it is determined that one or more passengers are not present within the vehicle 102 (at block 412), the enabled state of the device destination pointer application 132 is set to disabled. At block 416, if it is determined that one or more passengers are located within the vehicle 102 (at block 412), the enabled state of the device destination pointer application 132 is set to enabled.

At block 418, the user classification category of the user is identified by the user processing module 138. In an exemplary embodiment, as described above the location data provided by the user processing module 138 is used to determine the user classification category of the user to determine if the one or more portable electronic devices are operated by a driver and/or one or more passengers. At block 420, it is determined if the user classification category is identified as a passenger. At block 414, if it is determined that the user classification category is not identified as a passenger (i.e., one or more portable electronic devices 120 are not operated by one or more passengers and are being operated by a driver) (at block 420), the enabled state of the device destination pointer application 132 is set to disabled (to ensure that the driver can not utilize the device destination pointer application 132). At block 422, if it is determined that the user classification is identified as a passenger (i.e., one or more portable electronic devices 120 are operated by one or more passengers) (at block 420), the device destination pointer application 132 receives the destination point user input via the device destination point user interface 134. At block 424, the destination point is sent to the navigation system 108. At block 426, the navigation system 108 calculates the route and provides route guidance to the driver of the vehicle 102. This method ensures that the navigation system 108 can be safely utilized to provide route guidance to the driver to a desired destination point that is inputted when the vehicle 102 is being driven and is in motion. In addition, if the passenger(s) are present in the vehicle 102, this method allows the driver to avoid stopping the vehicle 102 in order for a destination point to be inputted to the navigation system 108.

As discussed, various embodiments of the device destination pointer system 100 can be utilized for the user to provide destination points to the navigation system 108 of the vehicle 102. Also, various embodiments of the device destination pointer system 100 can be utilized to send other types of data (e.g., media, files, playlists, etc.) to numerous vehicle 102 systems (e.g., audio system, infotainment system, etc.). In addition, numerous components and technologies that have not been discussed herein can be utilized to compute operations associated with the device destination pointer application 132 and to provide inputs to the navigation system 108. It is to be appreciated that in addition of the portable electronic device 120, the device destination pointer application 132 can be utilized on and/or with different types of devices that are in production and that are not yet in production. For example, the device destination pointer application 132 can be installed and utilized by connecting to a (alternate or secondary) navigation system 108 that is presented on a heads up display within the vehicle 102.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A method for limiting interaction between a portable electronic device and a navigation system in a vehicle, comprising:
   connecting one or more portable electronic devices to the navigation system;
   determining the presence of one or more passengers within the vehicle;
   setting an enabled state of a device destination pointer application stored on the one or more portable electronic devices based on the determination of the presence of one or more passengers within the vehicle; and
   controlling access to a user interface of the device destination pointer application based on the enabled state of the device destination pointer application.

2. The method of claim 1, wherein determining the presence of one or more passengers within the vehicle comprises determining if one or more passengers are occupying vehicle seats.

3. The method of claim 2, wherein determining the presence of one or more passengers within the vehicle comprises determining a type of one or more passengers present within the vehicle based on data received from a passenger sensing system, wherein the type of one or more passengers is at least one of: adult passengers, child passengers, and pet passengers.

4. The method of claim 1, wherein setting the enabled state of the device destination application comprises identifying if a driver or the one or more passengers is operating the one or more portable electronic devices and setting the enabled state of the device destination application to disabled upon identifying the driver is operating the one or more portable electronic devices.

5. The method of claim 1, wherein setting the enabled state of the device destination pointer application comprises setting the enabled state of the device destination application to enabled upon determining that of one or more passengers are present within the vehicle and determining that one or more passengers is operating the one or more portable electronic devices that are connected to the navigation system.

6. The method of claim 5, wherein setting the enabled state of the device destination pointer application comprises setting the enabled state of the device destination application to disabled upon determining at least one of: one or more passengers are not present within the vehicle and the driver is operating the one or more portable electronic devices that are connected to the navigation system.

7. The method of claim 6, comprising setting the enabled state of the device destination application to disabled upon determining that the one or more passengers present within the vehicle include at least one of: only child passengers, only pet passengers.

8. The method of claim 1, wherein controlling access to the device destination pointer user interface includes allowing the one or more passengers to access and provide inputs to the device destination pointer user interface based on the enabled state of the device destination application being set to enabled, wherein the device destination pointer user interface is utilized by the one or more passengers to send a desired destination point from the device destination pointer application to the navigation system.

9. The method of claim 1, comprising determining a vehicle state of motion from data received from a motion sensing system, and upon determining the vehicle is in motion, disabling a user interface of the navigation system.

10. A system for limiting interaction between a portable electronic device and a navigation system in a vehicle, comprising:
a device destination pointer application stored on one or more portable electronic devices, the one or more portable electronic devices being operably connected for computer communication to the navigation system; and
a passenger determinant module that is included as a module of the device destination pointer application that determines the presence of one or more passengers within the vehicle;
wherein the passenger determinant module sets an enabled state of the device destination pointer application stored on one or more portable electronic devices and controls access to a device destination pointer user interface of the device destination pointer application based on the enabled state of the device destination pointer application.

11. The system of claim 10, comprising a passenger sensing system of the vehicle including at least one of: cameras, seat weight sensors, and seat belt sensors, wherein the passenger determinant module determines the presence of the one or more passengers occupying vehicle seats of the vehicle from data received from the passenger sensing system.

12. The system of claim 11, wherein the passenger determinant module determines a type of one or more passengers that is present within the vehicle based on data received from the passenger sensing system wherein the type of one or more passengers is at least one of: adult passengers, child passengers, pet passengers.

13. The system of claim 10, comprising a user processing module determining if a driver or the one or more passengers is operating the one or more portable electronic devices, wherein the user processing module sets the enabled state of the device destination application to disabled upon determining that the driver is operating the one or more portable electronic devices.

14. The system of claim 10, wherein the passenger determinant module sets the enabled state of the device destination application to enabled upon determining that one or more passengers are present within the vehicle and determining that one or more passengers is operating the one or more portable electronic devices that are connected to the navigation system.

15. The system of claim 14, wherein the passenger determinant module sets the enabled state of the device destination application to disabled upon determining at least one of: one or more passengers are not present within the vehicle and the driver is operating the one or more portable electronic devices that are connected to the navigation system.

16. The system of claim 15, wherein the passenger determinant module sets the enabled state of the device destination application to disabled upon determining that the one or more passengers present within the vehicle include at least one of: only child passengers, only pet passengers.

17. The system of claim 10, comprising a destination sending module sending a desired destination point from the device destination pointer application to the navigation system and the navigation system computing a navigation route to the desired destination point sent from the one or more portable electronic devices based on the passenger determinate module allowing one or more passengers to access and provide inputs to the device destination pointer interface.

18. The system of claim 10, comprising an electronic control unit disabling a user interface of the navigation system based off determining that the vehicle is in a state of motion from data received from a motion sensing system, wherein the motion sensing system includes at least one of: an engine control unit, a transmission control unit, a vehicle speed sensor, and a brake signal sensor that determine if the vehicle is in a state of motion.

19. A non-transitory computer-readable storage medium storing instructions that when executed by a processor perform actions, comprising:
connecting one or more portable electronic devices to the navigation system;
determining the presence of one or more passengers within the vehicle;

setting an enabled state of a device destination pointer application stored on the one or more portable electronic devices based on the determination of the presence of one or more passengers within the vehicle; and controlling access to a device destination pointer user interface of the device destination pointer application based on the enabled state of the device destination pointer application.

20. The non-transitory computer-readable medium of claim 19, wherein setting an enabled state of a device destination pointer application includes setting the enabled state of the device destination application to enabled upon determining that one or more passengers are present within the vehicle and determining that one or more passengers is operating the one or more portable electronic devices that are connected to the navigation system.

* * * * *